US008159460B2

(12) United States Patent
Yu

(10) Patent No.: US 8,159,460 B2
(45) Date of Patent: Apr. 17, 2012

(54) FOUR AXLES CENTER WHEEL MODULE FOR MOUSE

(76) Inventor: Zhengming Yu, Guangdong (CN)

( * ) Notice: Subject to any disclaimer, the term of this patent is extended or adjusted under 35 U.S.C. 154(b) by 1084 days.

(21) Appl. No.: 11/996,659

(22) PCT Filed: Jul. 25, 2006

(86) PCT No.: PCT/CN2006/001842
§ 371 (c)(1),
(2), (4) Date: Jan. 24, 2008

(87) PCT Pub. No.: WO2007/012273
PCT Pub. Date: Feb. 1, 2007

(65) Prior Publication Data
US 2008/0192011 A1 Aug. 14, 2008

(30) Foreign Application Priority Data

| Jul. 25, 2005 | (CN) | 2005 2 0114279 U |
| Dec. 2, 2005 | (CN) | 2005 2 0142293 U |
| Dec. 30, 2005 | (CN) | 2005 2 0128710 U |
| Feb. 24, 2006 | (CN) | 2006 2 0006522 U |
| Apr. 29, 2006 | (CN) | 2006 2 0113568 U |
| Apr. 29, 2006 | (CN) | 2006 2 0113569 U |

(51) Int. Cl.
G09G 5/08 (2006.01)
(52) U.S. Cl. ........................ 345/163; 345/167
(58) Field of Classification Search ............ 345/163, 345/164, 167, 184
See application file for complete search history.

(56) References Cited

U.S. PATENT DOCUMENTS

| 6,188,393 | B1 * | 2/2001 | Shu | 345/184 |
| 6,967,645 | B2 * | 11/2005 | Wang | 345/167 |
| 7,479,945 | B2 * | 1/2009 | Lu | 345/163 |
| 2003/0025673 | A1 * | 2/2003 | Ledbetter et al. | 345/163 |
| 2005/0146500 | A1 * | 7/2005 | Cheng | 345/163 |
| 2008/0150894 | A1 * | 6/2008 | Chiang | 345/163 |

* cited by examiner

Primary Examiner — Quan-Zhen Wang
Assistant Examiner — Yuk Chow
(74) Attorney, Agent, or Firm — Global IP Services; Tianhua Gu

(57) ABSTRACT

A four axles center wheel module for mouse comprising a coder assembly for outputting a encoded pulse electronic signal, a center wheel, and a mouse circuit board, the coder assembly is set on the center shaft of the center wheel; a swing component is installed in a slot on a mouse motherboard or the mouse circuit board, a front end supporting shaft of the swing component is installed on the front support of the mouse motherboard or circuit board, and a groove is set at both sides of the swing component to support the center wheel, touch arms for cooperating with two switches mounted on the mouse circuit board are set on both sides of the swing component, and a wheel downward press key touch arm is set at the trailing end of the swing component while a wheel downward press key switch is set on the mouse circuit board below the wheel press downwards key touch arm. To prevent the center wheel module involved in the above technical solution from making a misoperation in use, the following structures are set in the present invention: a position limiting device, or a lever component and a touch arm cooperated with it, or a swing composite switch, or a headstand switch.

17 Claims, 23 Drawing Sheets

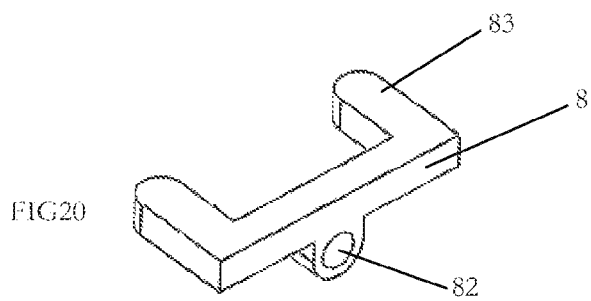
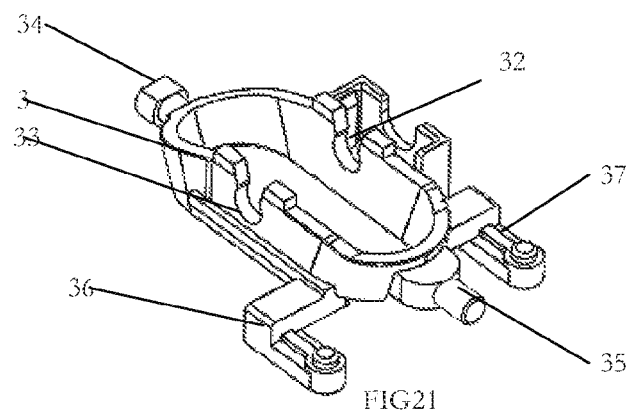
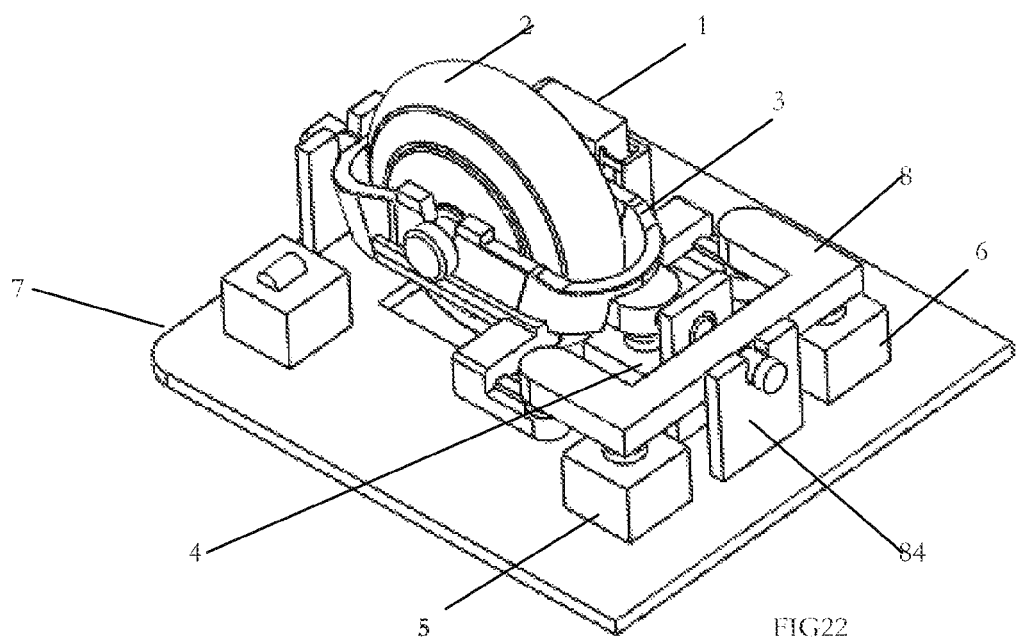

FOUR AXLES CENTER WHEEL MODULE FOR MOUSE

CROSS REFERENCE TO RELATED PATENT APPLICATION

This patent application claims the priorities of the Chinese patent applications No. 200520114279.2 with filing date of Jul. 25, 2005, No. 200520142293.3 with filing date of Dec. 2, 2005, No. 200520128710.9 with filing date of Dec. 30, 2005, No. 200620006522.3 with filing date of Feb. 24, 2006, No. 200620113568.5 with filing date of Apr. 29, 2006 and No. 200620113569.X with filing date of Apr. 29, 2006.

FIELD OF THE INVENTION

The present invention relates to a four axles center wheel module set in a mouse, more particularly, to a center wheel module for a mouse, which can easily turn up and down, left and right the page on a window of a computer in use.

BACKGROUND OF THE INVENTION

As seen in FIG. 1, the conventional four axles center wheel modules for a mouse basically adopts the bottom tray support design, which is balanced by a left spring and a right spring and meantime disposed with a mounting upper cover, with a left touch arm and a right touch arm on two sides of the middle part of the module. The conventional four axles center wheel modules for mouse are of complex structure, various parts and components, manufacturing difficulty, high cost, low flexibility and unsuitable dispositions for dynamic balance, which are not suitable for individualized design of mouse.

SUMMARY OF THE INVENTION

In order to eliminate limitations of the conventional four axles center wheel module for mouse, namely, complex structure, too many parts and components, manufacture difficulty, high cost, low flexibility and unsuitable dispositions, the present invention provides a new four axles center wheel module for mouse with simple structure, a few parts and components, easy assembling, low cost and easy operation.

One technical solution of the present invention is that: a four axles center wheel module for mouse comprising a coder assembly for outputting a encoded pulse electronic signal, a center wheel, and a mouse circuit board, the coder assembly is set on the center shaft of the center wheel; a swing component is installed in a slot on a mouse motherboard or the mouse circuit board, a front end supporting shaft of the swing component is installed on the front support of the mouse motherboard or circuit board, and a groove is set at both sides of the swing component to support the center wheel, touch arms for cooperating with two switches mounted on the mouse circuit board are set on both sides of the swing component, and a wheel downward press key touch arm is set at the trailing end of the swing component while a wheel downward press key switch is set on the mouse circuit board below the wheel press downwards key touch arm.

A back support is set on the mouse motherboard or the circuit board, and a back end supporting shaft clapped on the back support is set on the swing component.

To prevent the center wheel module involved in the above technical solution from making a misoperation in use, the following structures are set in the present invention: a position limiting device, or a lever component and a touch arm cooperated with it, or a swing composite switch, or a headstand switch.

Furthermore, in order to reduce the size of the center wheel module for mouse, in the present invention, the coder assembly is set in the center wheel module for mouse, and mounting legs are also provided to fix the coder assembly.

Another technical solution of the present invention is that: a four axles center wheel module for mouse includes a coder assembly for outputting an encoded pulse electronic signal, a center wheel and a mouse circuit board. The coder assembly is set on the center shaft of the center wheel and a swing support is set in a slot on the mouse motherboard or the circuit board. A Supporting shaft on one end of the swing support is installed on the support of the mouse motherboard or the circuit board, and a card groove is set at both sides of the swing support to support the center wheel. A rotating shaft on one end of the swing support is installed in the center hole of the swing composite switch fixed on the circuit board; press downwards key switches on both sides of the swing component are replaced by the swing composite switch.

The beneficial effects of the present invention are: because the balance is realized by the special and natural resilience of the left and right switches of the four axles center wheel module for mouse, the structure is simplified and the cost is reduced; because a mechanics balanced triangle is formed among the left and right touch arms at both sides of the front end, and the middle press key contact, the module is more balanced and reliable; because the coder is set on outer side of or in the center wheel, the production and assembly operation is simplified and the center wheel can be big or small with more flexible design, which is convenient for individualized design of mouse; because the conventional bottom tray support of the four axles center wheel for a mouse and the upper cover are not used, the structure is heavily simplified.

BRIEF DESCRIPTION OF THE DRAWINGS

FIG. 20 is a structural view of a lever assembly of the fourth embodiment of the present invention;

FIG. 21 is a structural view of the swing component of the fourth embodiment of the present invention;

FIG. 22 is a structural view of a change of the fourth embodiment of the present invention;

DETAIL DESCRIPTION OF THE INVENTION

Figure 1:
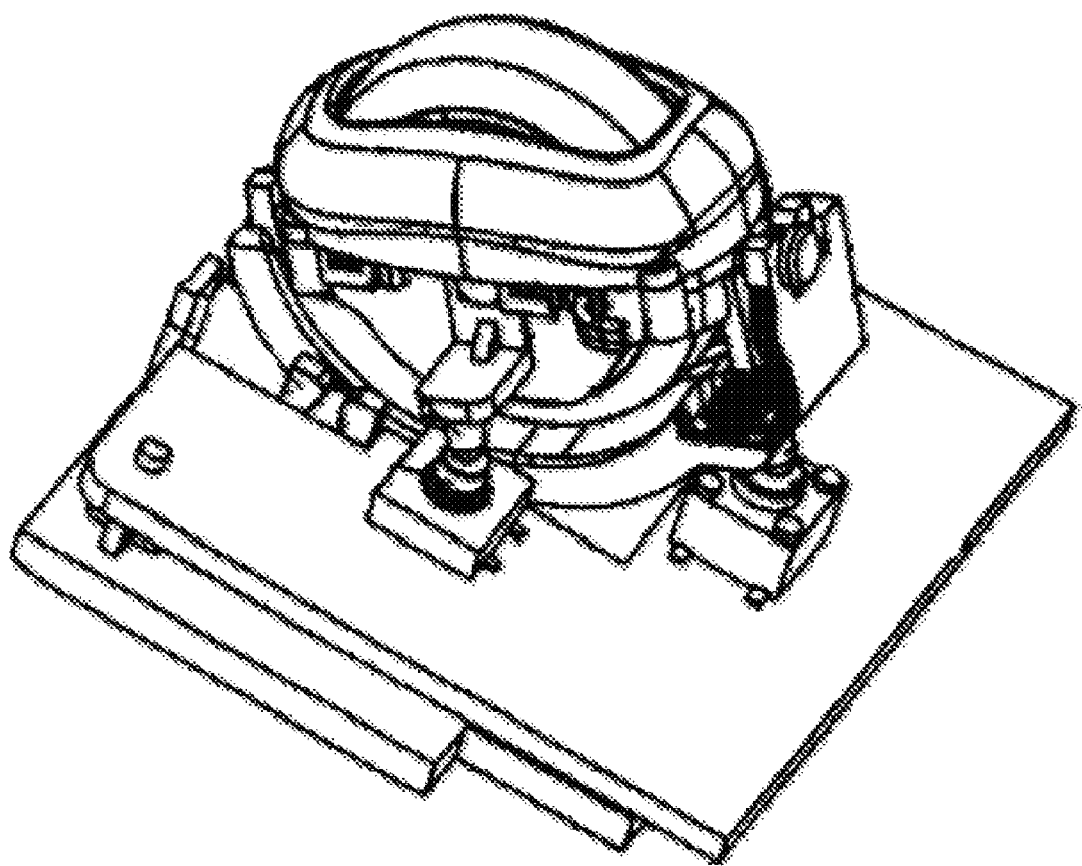
FIG. 1 is a structural view of a conventional four axles center wheel module for mouse.
Figure 2:
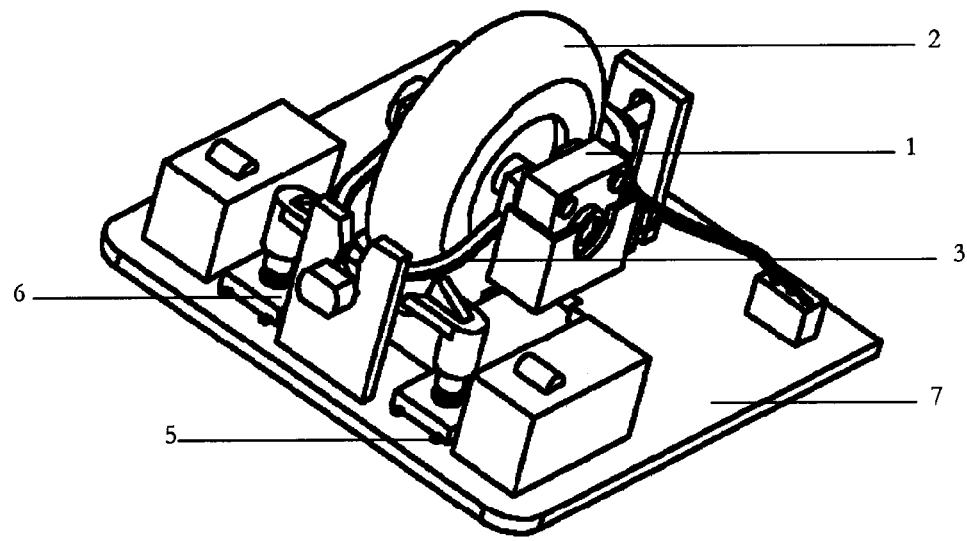
FIG. 2 is a structural view of the first embodiment of the present invention.
Figure 3:
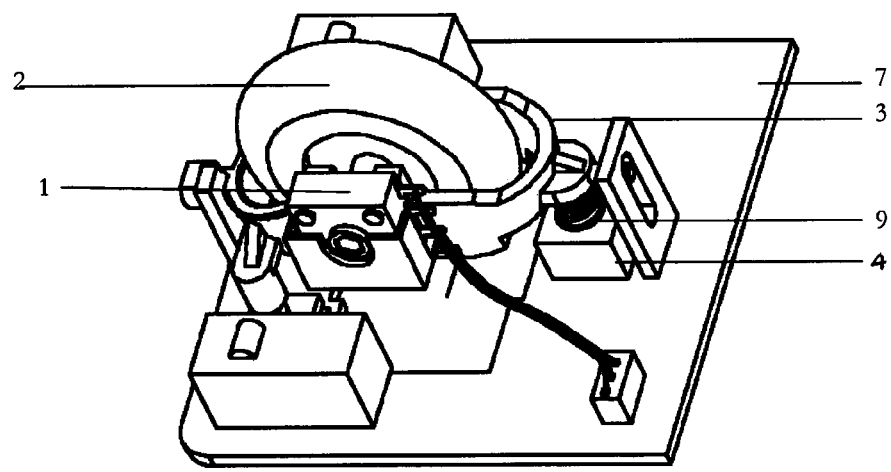
FIG. 3 is a structural view of the first embodiment of the present invention seen from another direction.
Figure 4:
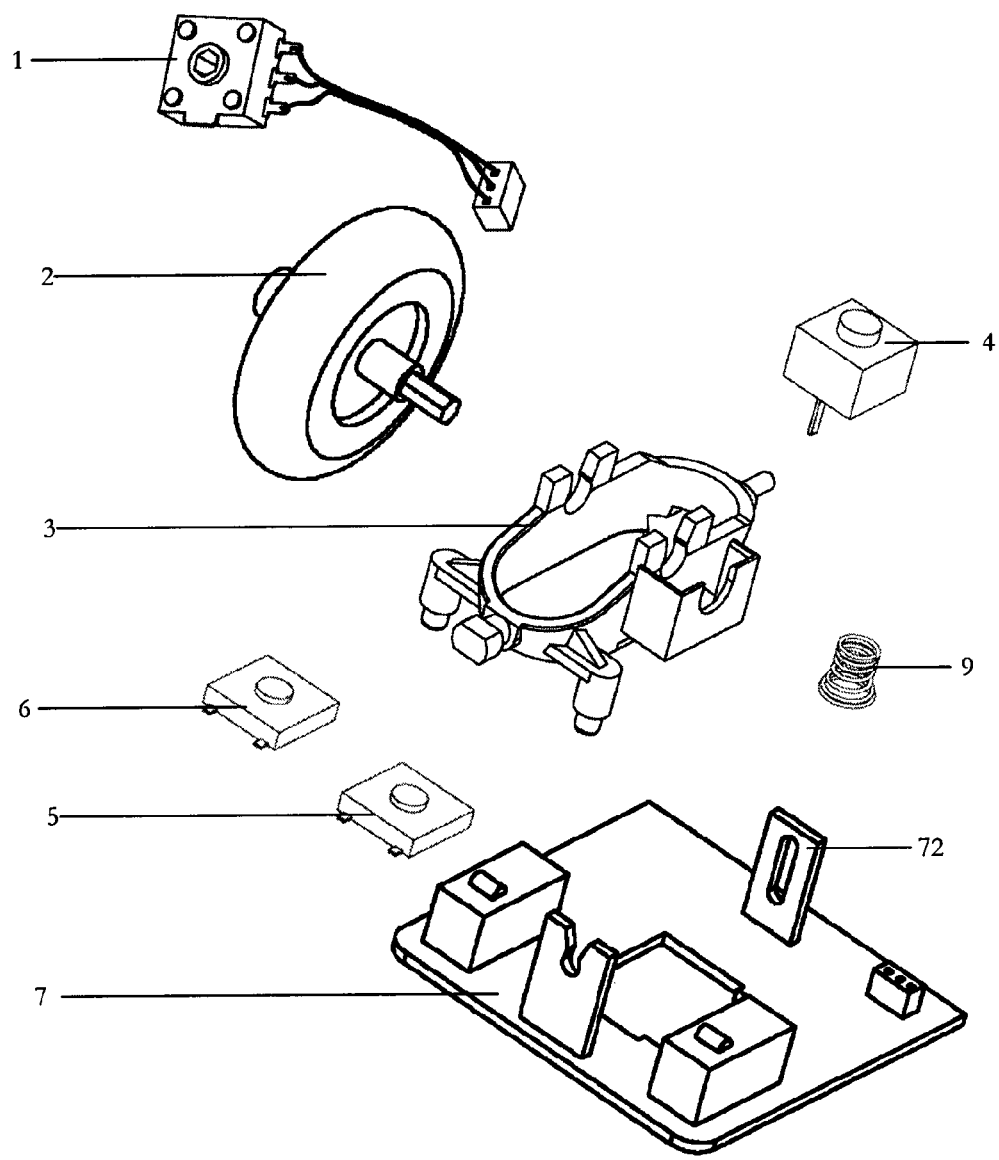
FIG. 4 is an exploded structural view of the first embodiment of the present invention.
Figure 5:
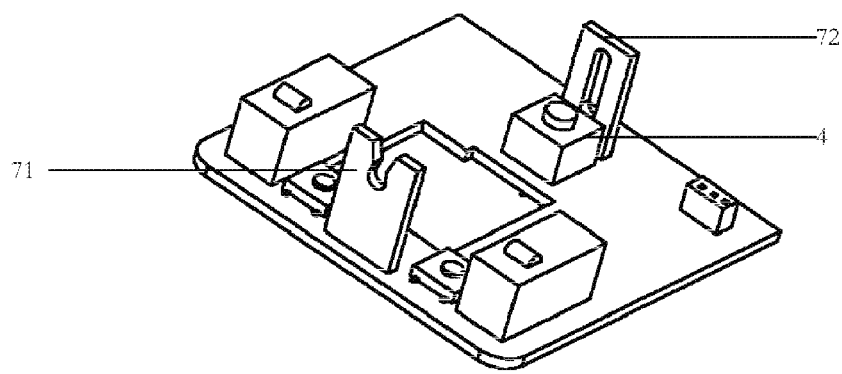
FIG. 5 is a structural view of a mouse circuit board of the first embodiment of the present invention.
Figure 6:
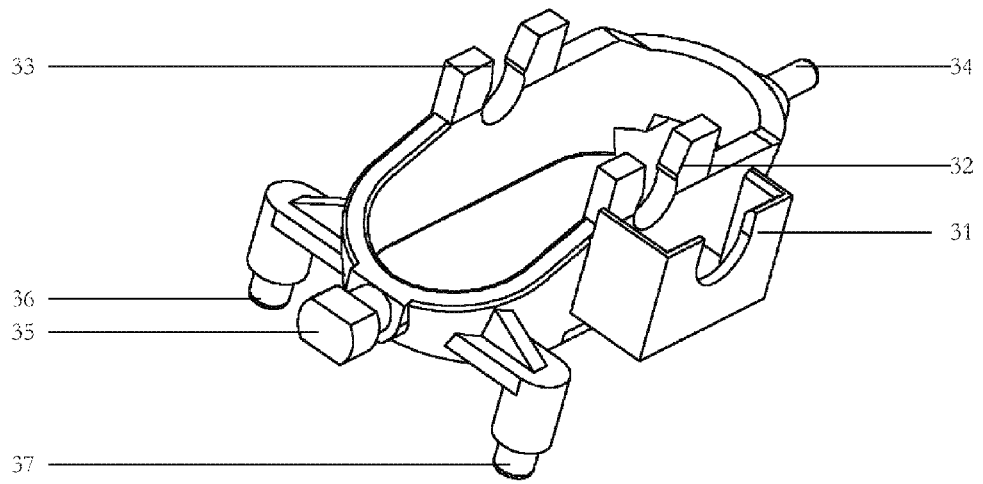
FIG. 6 is a structural view 1 of the swing component of the first embodiment of the present invention.
Figure 7:
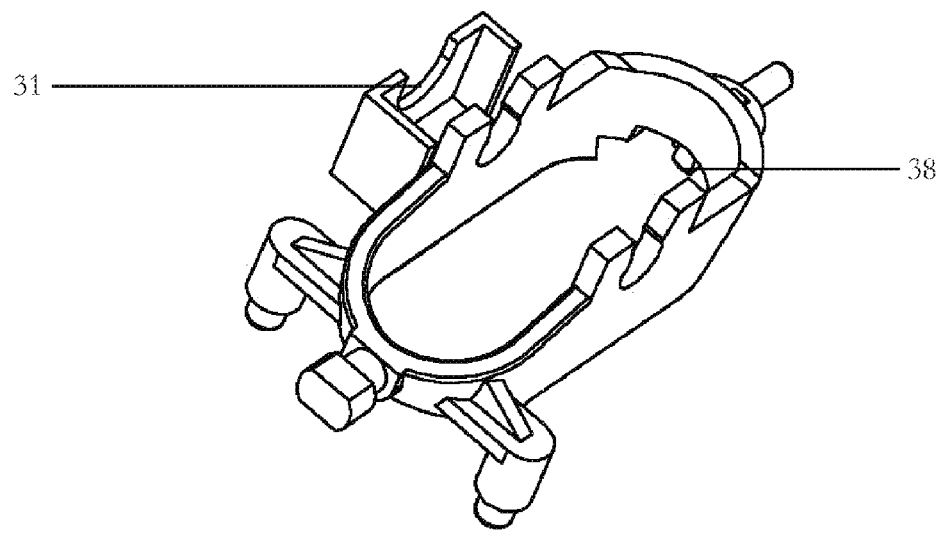
FIG. 7 is a structural view 2 of the swing component of the first embodiment of the present invention.
Figure 8:
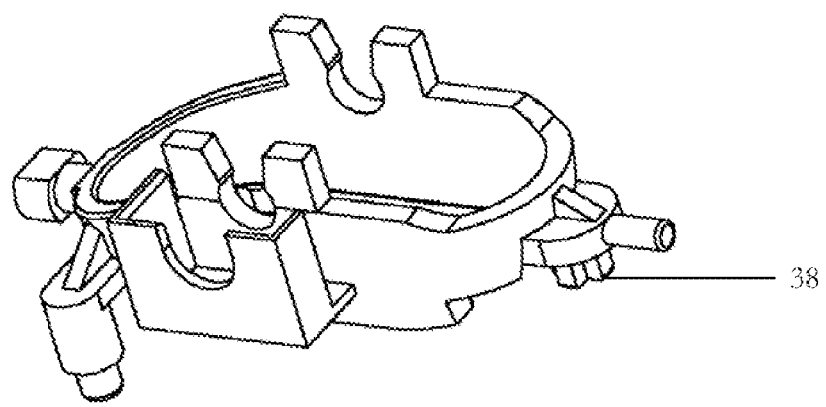
FIG. 8 is a structural view 3 of the swing component of the first embodiment of the present invention.
Figure 9:
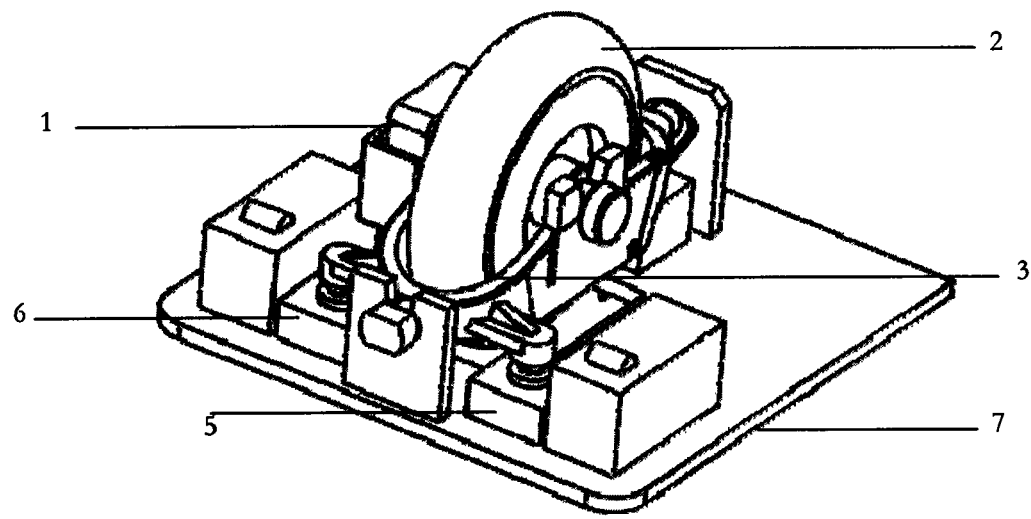
FIG. 9 is a structural view of the second embodiment of the present invention.
Figure 10:
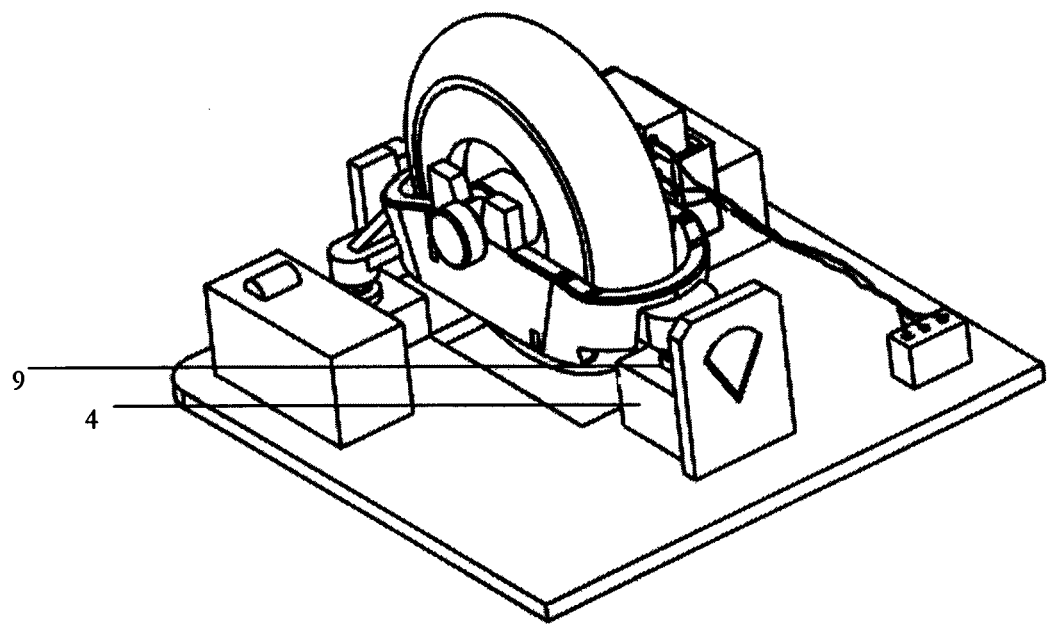
FIG. 10 is a structural view of the second embodiment of the present invention seen from another direction.
Figure 11:
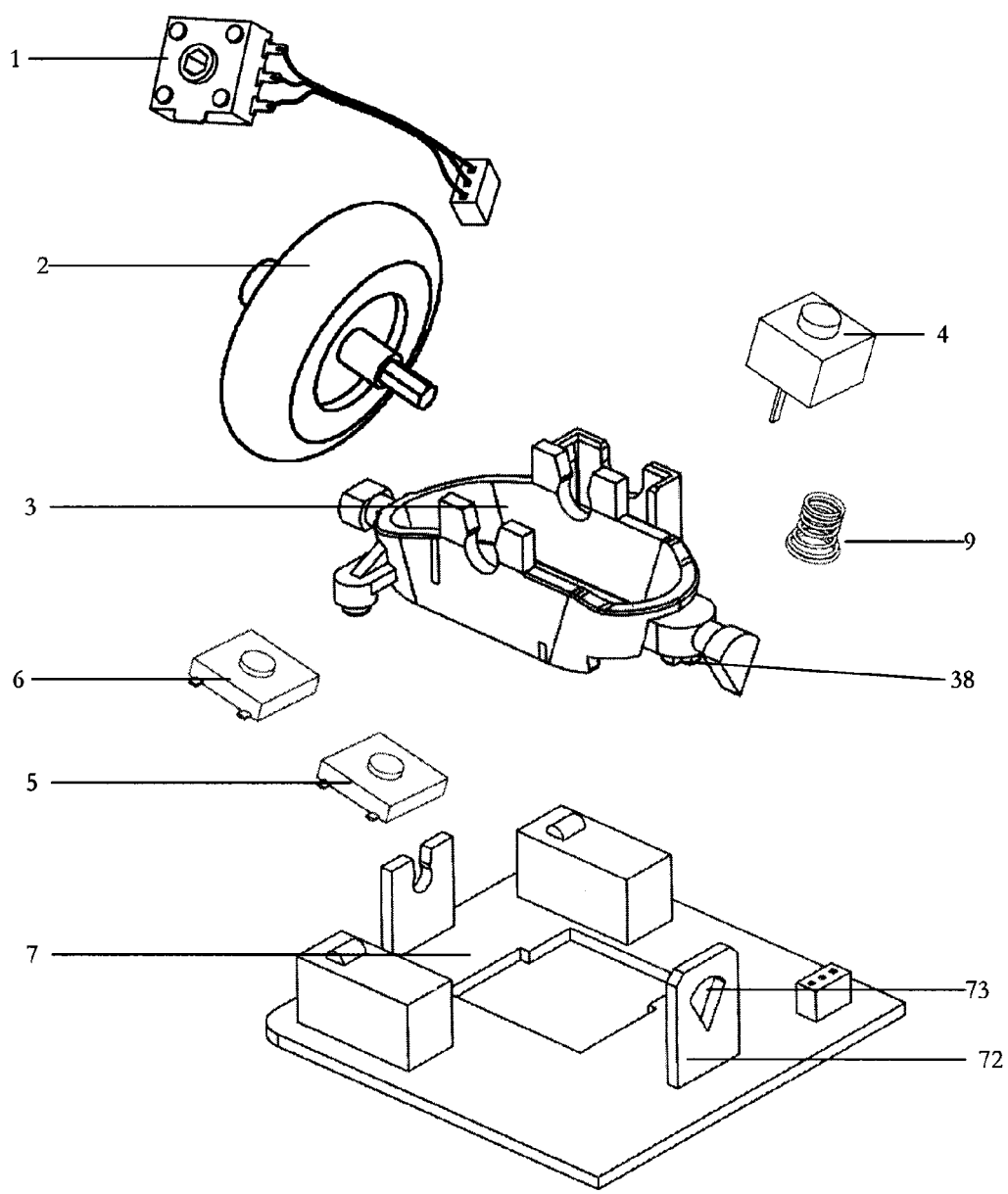
FIG. 11 is an exploded structural view of the second embodiment of the present invention.
Figure 12:
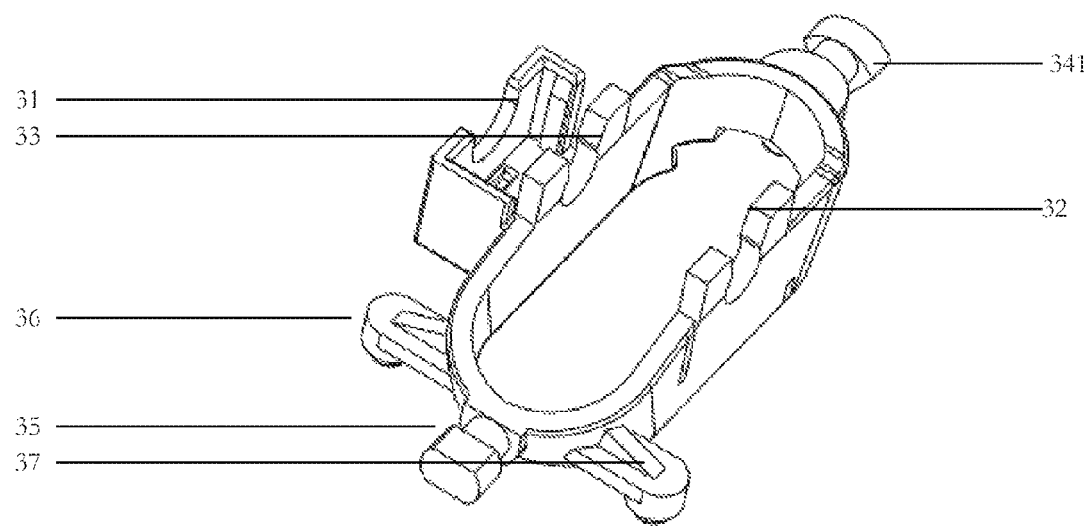
FIG. 12 is a structural view of the swing component of the second embodiment of the present invention.
Figure 13:
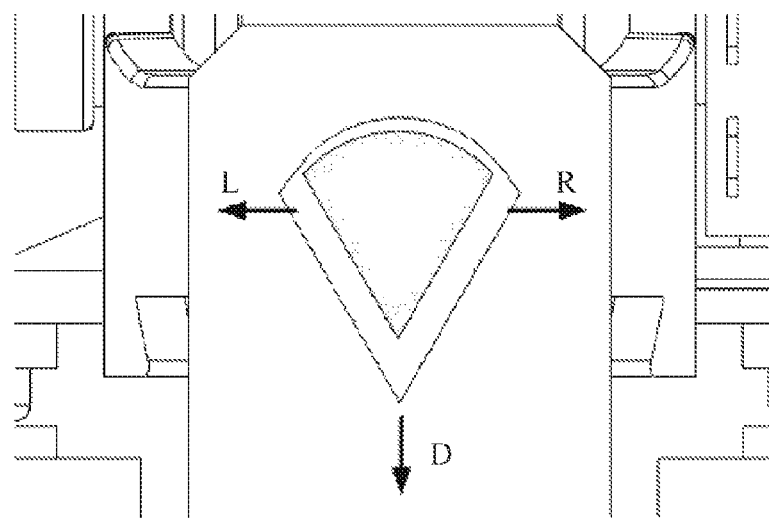
FIGS. 13 and 14 illustrate the enlarged view of the back support and the supporting shaft of the second embodiment of the present invention.
Figure 14:
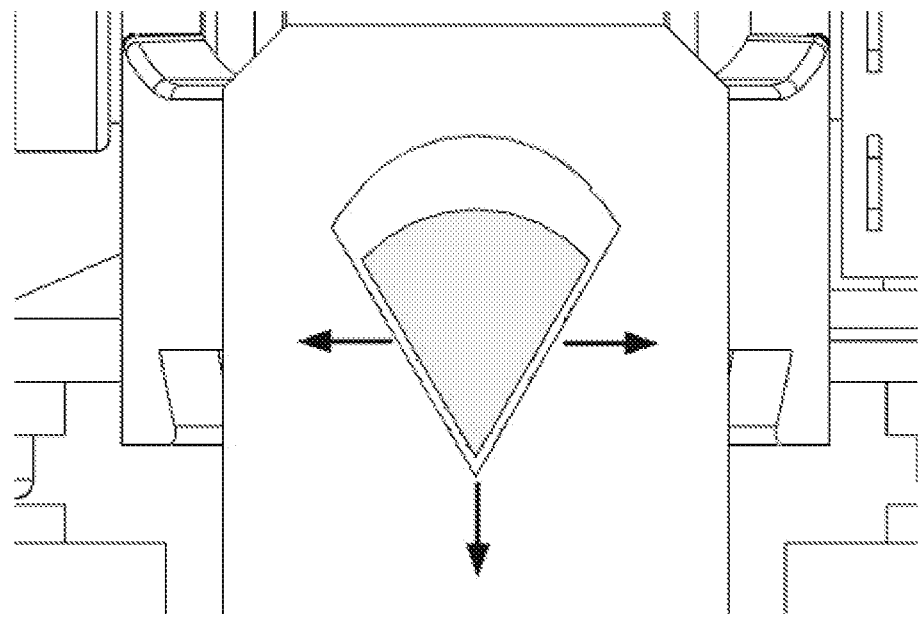

As seen in FIGS. 2-8 illustrating the first embodiment of the present invention, a four axles center wheel module for mouse includes a coder assembly 1 for outputting an encoded pulse electronic signal, a center wheel 2 and a mouse circuit board 7. The coder assembly 1 is set on the center shaft of the center wheel 2 and its three outputting terminals are connected to the mouse circuit board 7 through flat cable. A swing component 3 is set in a slot extending out of the mouse circuit board 7. The front end supporting shaft 35 of the swing component 3 is installed on the front support 71 of the mouse motherboard or the circuit board, and the back end supporting shaft 34 on the back part of the swing component 3 is clipped by the back support 72 of the mouse motherboard or the circuit board. The card grooves 32, 33 are set at both sides of the swing component 3 to support the center wheel 2. The coder 1 is set in a square slot 31 formed at one side of the swing component. The touch arms 37 and 36 are set at both sides of the front part of the swing component 3 while the switches 5 and 6 are set on the mouse circuit board 7 below the touch arms. A wheel downward press key touch arm 38 is set at the trailing end of the swing component 3 while a wheel downward press key switch 4 is set on the mouse circuit board 7 below the wheel press downwards key touch arm. The wheel downward press key touch arm 38 is wound around a spring 9.

When the center wheel 2 is driven to swing left, the left touch arm 37 of the swing component 3 contacts the left switch 5 of the mouse circuit board, the left switch 5 will then output an on/off signal to move the page left or turn the page; when the center wheel 2 is driven to swing right, the right touch arm 36 of the swing component 3 contacts the right switch 6 of the mouse circuit board, and then the right switch 6 will output an on/off signal to move the page right or turn the page.

When the center wheel 2 is pressed down, the downward press key touch arm 38 of the swing component will be pressed down and move the wheel downward press key switch 4 on the mouse circuit board, realizing the function of the middle button of the mouse. When it is released, the four axles center wheel module for mouse will be repositioned by the spring 9. If a structure without the spring is adopted, the four axles center wheel module for mouse will be repositioned by the resilience of the wheel downward press key switch 4 with large elasticity.

As seen in FIGS. 9-14 illustrating the second embodiment of the present invention, a four axles center wheel module for mouse includes a coder assembly 1 for outputting a encoded pulse electronic signal, a center wheel 2 and a mouse circuit board 7. The coder assembly 1 is set on the center shaft of the center wheel 2 while the three outputting terminals of the coder assembly 1 are connected to the mouse circuit board 7 through flat cable. A swing component 3 is set in a slot extending out of the mouse circuit board 7. The front end supporting shaft 35 of the swing component 3 is installed on the front support 71 of the mouse motherboard or the circuit board while the back support 72 is set on the mouse motherboard or the circuit board. On back part of the swing component 3 is set a sector-shaped back supporting shaft 34, which is clipped by a sector-shaped groove 73 of the back support 72. The card grooves 32, 33 are set at both sides of the swing component 3 to support the center wheel 2. The coder 1 is set in a square slot 31 formed at one side of the swing component. The touch arms 37 and 36 are set at both sides of the front part of the swing component 3 while the switches 5 and 6 are set on the mouse circuit board 7 below the touch arms. A wheel downward press key touch arm 38 is set at the trailing end of the swing component 3 while a wheel downward press key switch 4 is set on the mouse circuit board 7 below the wheel downward press key touch arm. The wheel downward press key touch arm 38 is wound around a spring 9.

When the four axles center wheel module is in free state, there is enough space in the sector-shaped groove 73 for movement of the sector-shaped back end supporting shaft 34, the sector-shaped back end supporting shaft 34 can swing left (L) and right (R), and press downward (D). When a downward press operation is carried out in the four axles center wheel module, the swing left and swing right of the sector-shaped back supporting shaft 34 in the sector-shaped groove 73 will be resisted and stopped by both sides of the sector-shaped groove 73, so a sole movement is ensured. A downward press operation is easy to be performed in the conventional four axles center wheel module for mouse, but since the columnar back supporting rod can rotate freely in the circular groove of the back support, a misoperation of swinging left and right will be caused easily.

Figure 15:
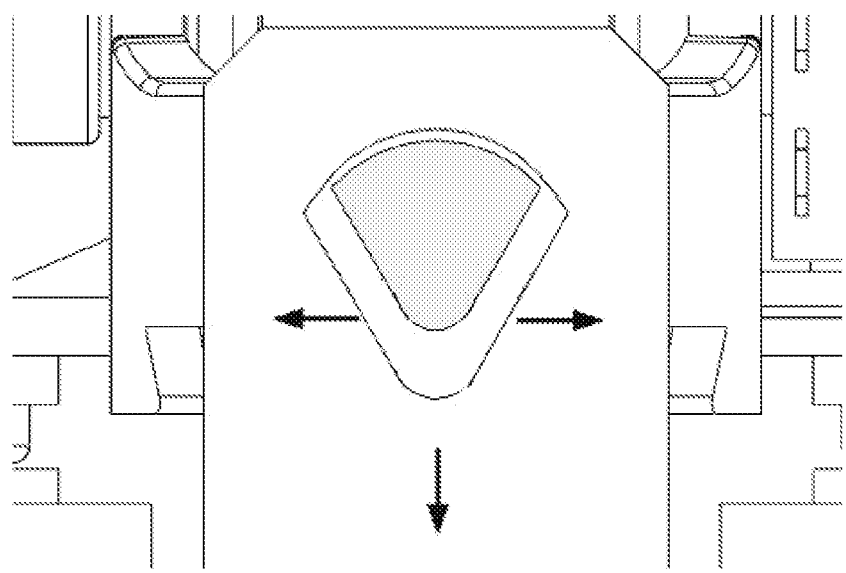
FIGS. 15 and 16 illustrate the enlarged views of the back support and the supporting shaft of two other structures of the second embodiment of the present invention.
Figure 16:
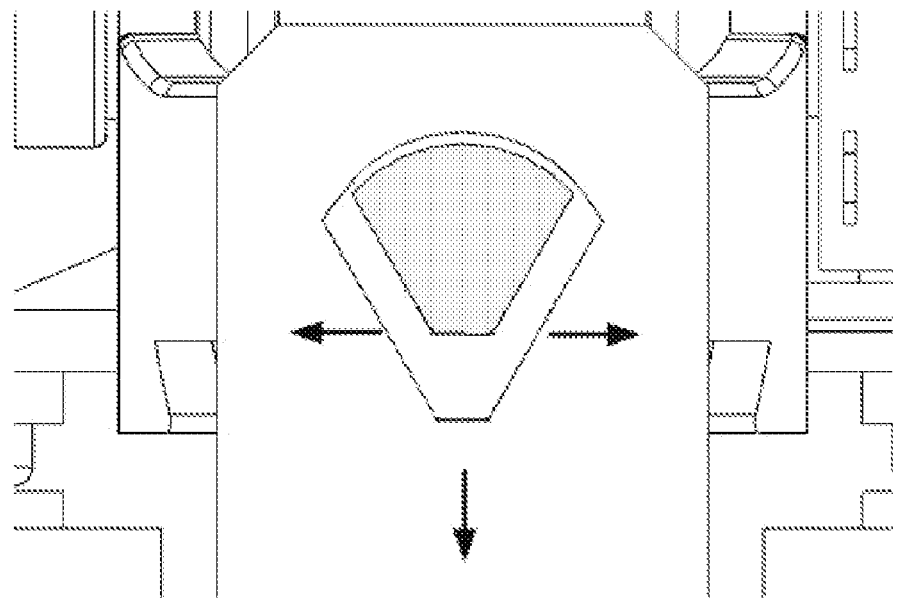

As seen in FIGS. 15 and 16, the bottom of the supporting shaft with sector-shaped section can be an arc surface and the bottom of the sector-shaped groove of the support can be a corresponding arc surface; the bottom of the supporting shaft with sector-shaped section can also be a plane while the bottom of the sector-shaped groove of the support can be a corresponding plane.

Figure 17:
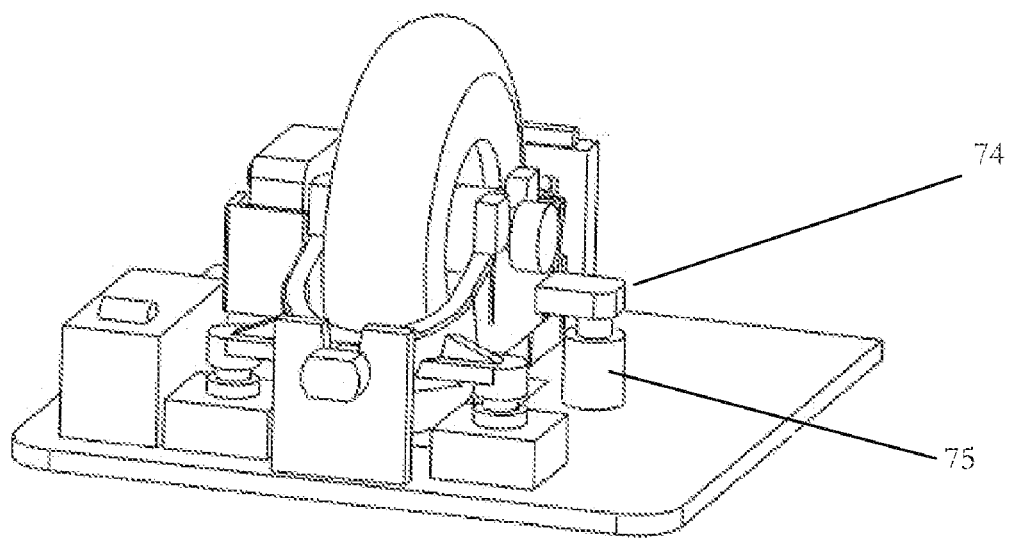
FIG. 17 is a structural view of the third embodiment of the present invention.
Figure 18:
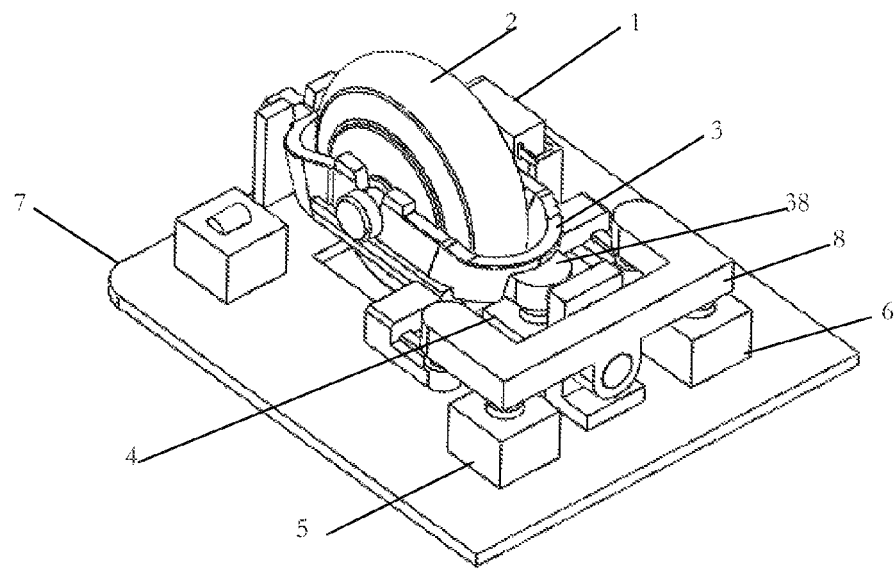
FIG. 18 is a structural view of the fourth embodiment of the present invention.
Figure 19:
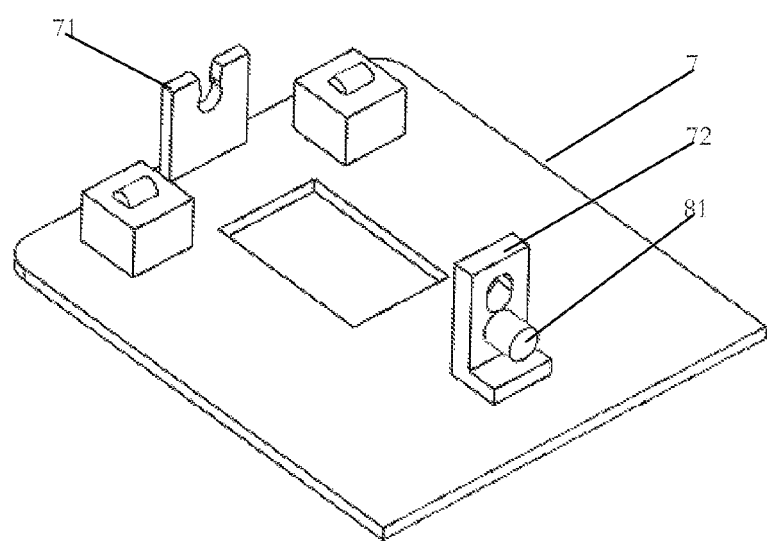
FIG. 19 is a structural view of the mouse circuit board of the fourth embodiment of the present invention.

As seen in FIG. 17 illustrating the third embodiment of the present invention, a position limiting device is set respectively on the swing component and the mouse circuit board of the four axles center wheel module of the second embodiment to prevent that, under press operation, a signal is generated because of kinetic energy left and right misoperation by swinging left and right of the swing component. The said position limiting device includes the position limited column 74 at two sides of the swing component 3 and the position limited holes at corresponding locations of the mouse circuit board 7.

As seen in FIGS. 18-21 illustrating the fourth embodiment of the present invention, a four axles center wheel module for mouse includes a coder assembly 1 for outputting a encoded pulse electronic signal, a center wheel 2 and a mouse circuit board 7. The coder assembly 1 is set on the center shaft of the center wheel 2. A swing component 3 is set in a slot extending out of the mouse circuit board 7. The supporting shafts 34 and 35 on both ends of the swing component 3 are installed on the front support 71 and the back support 72 on the mouse motherboard or the circuit board. The card grooves 32 and 33 are set at both sides of the swing component 3 to support the center wheel 2. The coder 1 is set in a square slot 31 formed at one side of the swing component. A wheel downward press key touch arm 38 is set at the trailing end of the swing component 3 while a wheel downward press key switch 4 is set on the mouse circuit board 7 below the wheel press downwards key touch arm. A cylinder 81 is set on the back support 72, and a corresponding circular hole 82 is disposed in a lever assembly 8. The lever assembly 8 is set on the cylinder 81. Pivoted at the cylinder 81, the extending arm 83 perpendicular to the lever extend from both side of the lever assembly. The touch arms set at both sides of the swing component 3 are installed below the extending arms 83. The switches 5 and 6 are set on the circuit board 7 at the cross connection part of the extending arms 83 and the lever. The lever assembly 8 can also be installed on the front support; the switches 5 and 6 as well as the touch arms 36 and 37 can be set on the front part of the mouse circuit board correspondingly.

Figure 23:
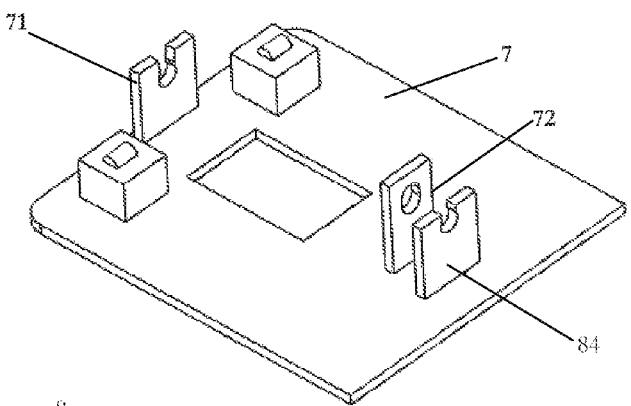
FIG. 23 is a structural view of a change of the mouse circuit board of the fourth embodiment of the present invention.
Figure 24:
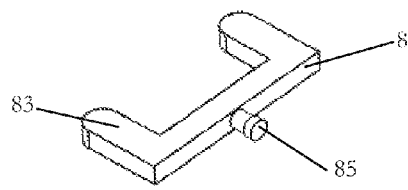
FIG. 24 is a structural view of a change of the lever assembly of the fourth embodiment of the present invention.
Figure 25:
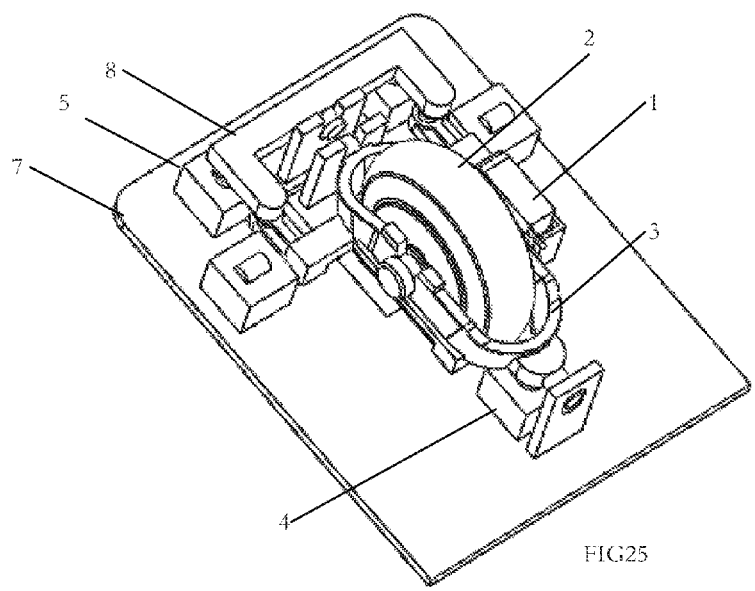
FIG. 25 is a structural view of another change of the fourth embodiment of the present invention.
Figure 26:
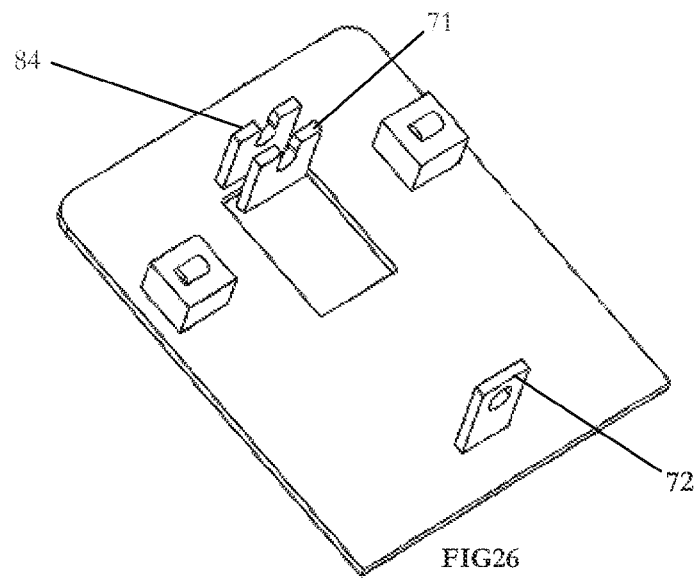
FIG. 26 is a structural view of another change of the mouse circuit board of the fourth embodiment of the present invention.
Figure 27:
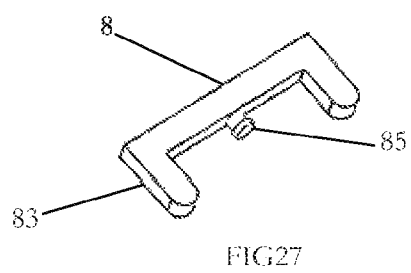
FIG. 27 is a structural view of another change of the lever assembly of the fourth embodiment of the present invention.
Figure 28:
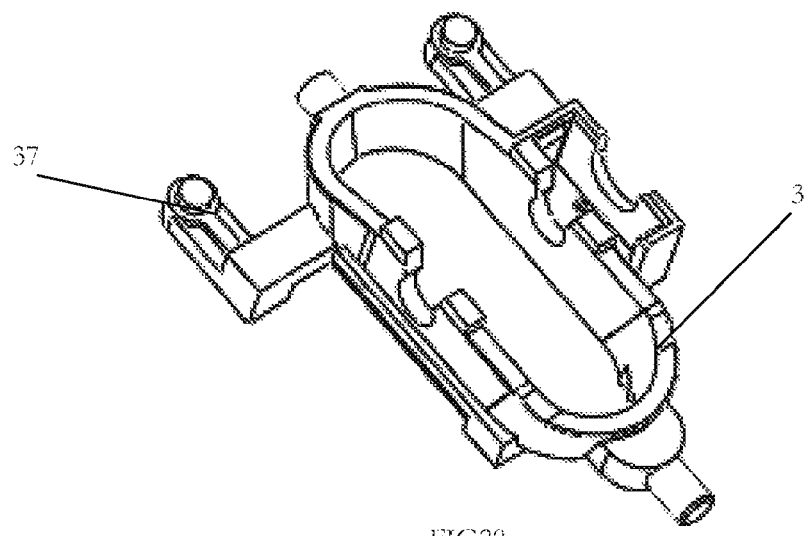
FIG. 28 is a structural view of another change of the swing component of the fourth embodiment of the present invention.

As seen in FIGS. 22-24, a support 84 with a circular hole can also be set at back of the back support 72. Meanwhile, a cylinder convex 85 is set at the lever assembly 8, which is inserted into the circular hole and pivoted at the support 84.

As seen in FIGS. 25-28, a support 84 with a circular hole can also be set in front of the front support 71. Meanwhile, a cylinder convex 85 is set at the lever assembly 8, which is inserted into the circular hole and pivoted at the support 84. At the same time, the touch arms 36 and 37, the switches 5 and 6 can also be set in front of the swing component.

Figure 29:
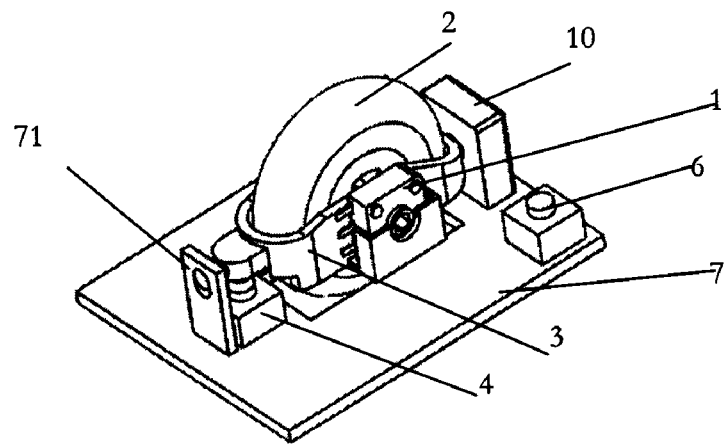
FIG. 29 is a structural view of the fifth embodiment of the present invention.
Figure 30:
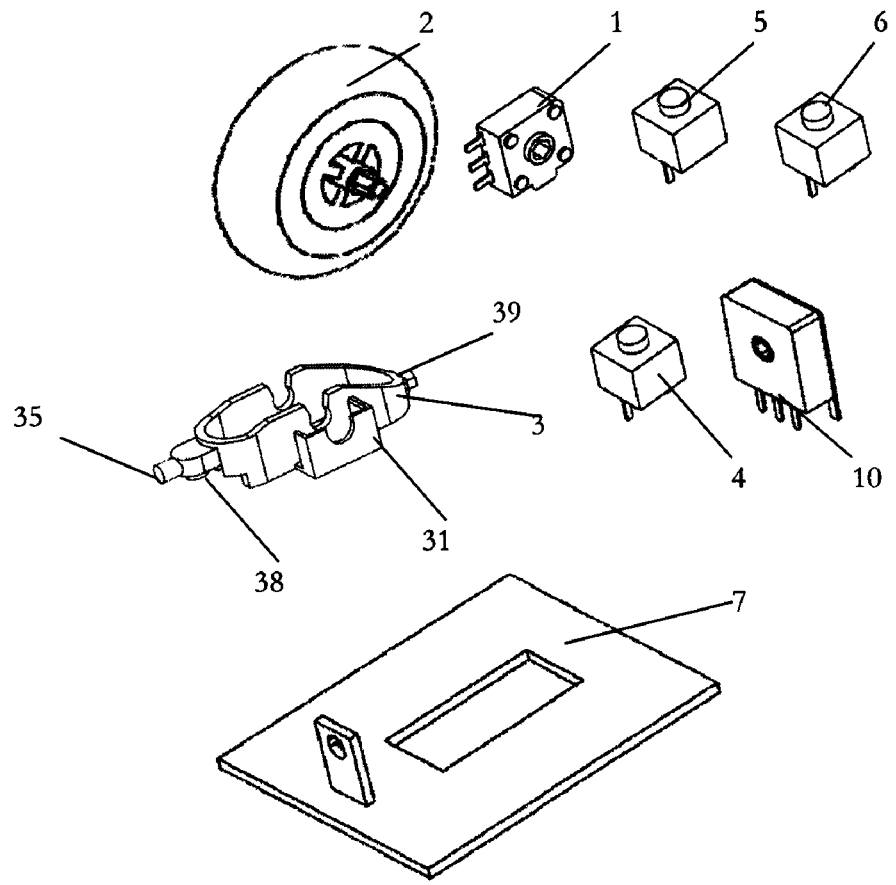
FIG. 30 is an exploded structural view of the fifth embodiment of the present invention.
Figure 31:
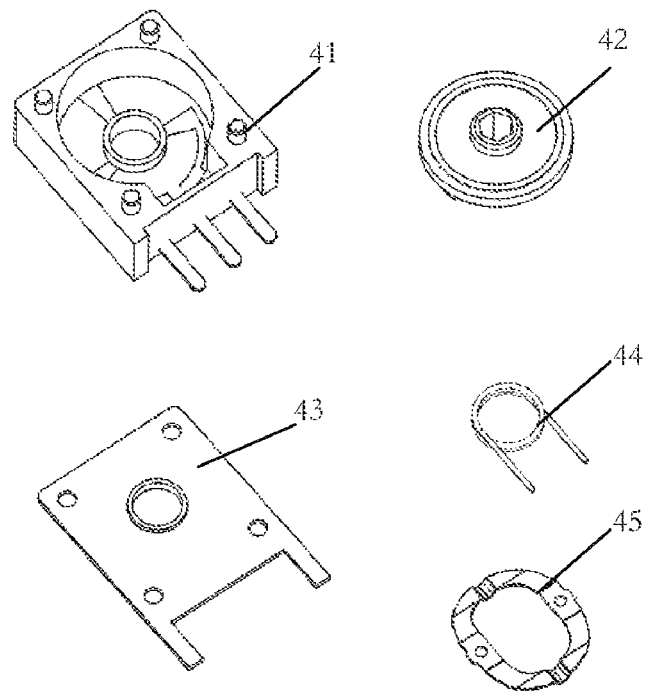
FIG. 31 is an exploded structural view of the swing composite switch of the fifth embodiment of the present invention.

As seen in FIGS. 29-31 illustrating the fifth embodiment of the present invention, a four axles center wheel module for mouse includes a coder assembly 1 for outputting a encoded pulse electronic signal, a center wheel 2 and a mouse circuit board 7. The coder assembly 1 is set on the center shaft of the center wheel 2. A swing component 3 is set in a slot extending out of the mouse circuit board 7. On one end of the swing component 3 is set a front end supporting shaft 35, which is installed on the front support 71 of the mouse motherboard or the circuit board. The card grooves are set at both sides of the swing component 3 to support the center wheel 2. A rotating shaft 39 is set at one end of the swing component 3, and is installed in the center hole of the swing composite switch 10. The swing composite switch 10 is fixed on the circuit board 7. The coder assembly 1 is installed in a square slot 31 formed on one side of the swing component 3. A downward press key touch arm 38 is set at one end of the supporting shaft of the swing component 3 and a downward press key switch 4 is set at the corresponding position of the mouse circuit board 7. The said swing composite switch 10 includes a bottom base 41, a rotator 42, a casing 43, a spring 44 and a switching piece 45. The switching piece 45 is installed on a reference column of the lower part of the rotator 42, with its both electric conductive convexes contacting the inner surface of the bottom base 41. The spring 44 is installed in the groove of the rotator 42, with its extending part clipped in the gap of the bottom base 41. The casing 43 is installed and fixed on four reference columns of the bottom base 41 by riveting.

In use, the center wheel 2 is shaken left and right, and the rotating shaft drives the rotator 42 to rotate, so that the switching piece 45 contacts the metal piece on the surface of the bottom base 41, a signal is output and the page is turned left and right. When the swing component 3 is pressed downwards, the downward press key touch arm 38 is activated and the identification function is performed.

Figure 32:
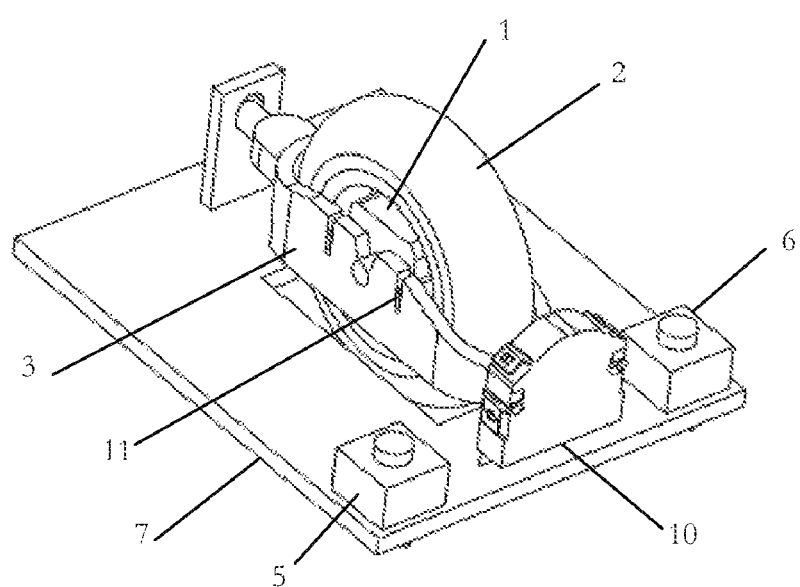
FIG. 32 is a structural view of the sixth embodiment of the present invention.
Figure 33:
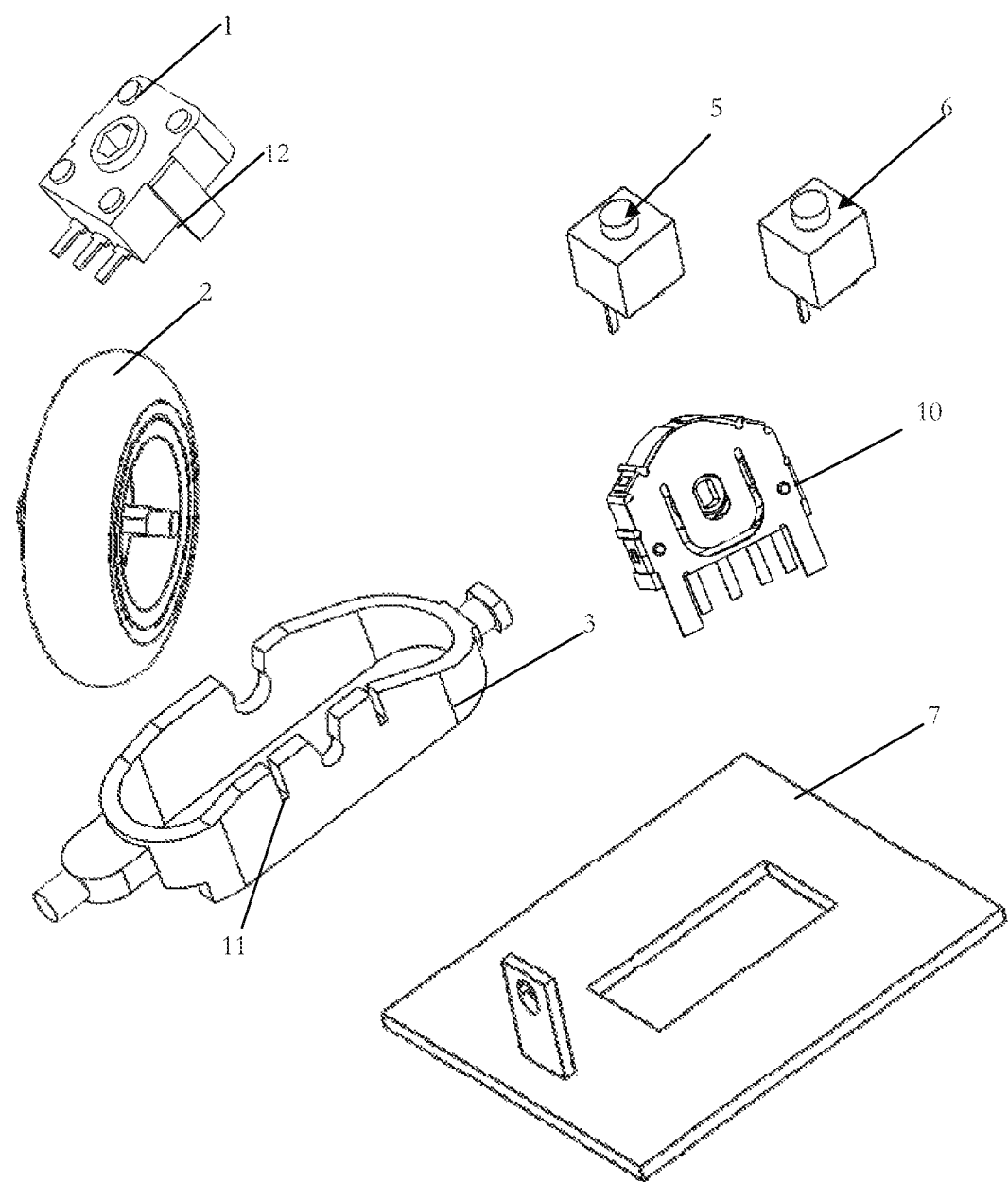
FIG. 33 is an exploded structural view of the sixth embodiment of the present invention.
Figure 34:
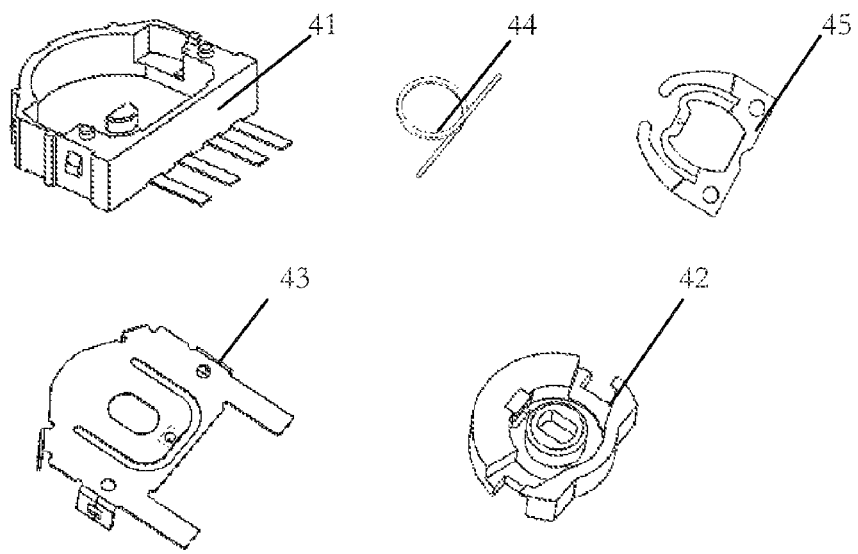
FIG. 34 is an exploded structural view of the swing composite switch of the sixth embodiment of the present invention.

As seen in FIGS. 32-34 illustrating the sixth embodiment of the present invention, a four axles center wheel module for mouse includes a coder assembly 1 for outputting a encoded pulse electronic signal, a center wheel 2, a mouse circuit board 7. The coder assembly 1 is set on the center shaft of the center wheel 2. A swing component 3 is set in a slot extending out of the mouse circuit board 7. A front end supporting shaft 35 is set on one end of the swing component 3, and is installed on the front support 71 of the mouse motherboard or the circuit board. The card grooves are set at both sides of the swing component 3 to support the center wheel 2. A rotating shaft 39 is set at one end of the swing component 3, and is installed in the center hole of the swing composite switch 10. The swing composite switch 10 is fixed on the circuit board 7. The coder assembly 1 is installed in a space in the center wheel 2, with its fixing legs 12 installed in a reference slot 11 on one side of the swing component 3. The said swing composite switch 10 includes a bottom base 41, a rotator 42, a casing 43, a spring 44 and a switching piece 45. The switching piece 45 is installed on a reference column of the lower part of the rotator 42, with its both electric conductive convexes contacting the inner surface of the bottom base 41. The spring 44 is installed in the groove of the rotator 42, with its extending part clipped in the gap of the bottom base 41. The casing 43 is installed and fixed on four reference columns of the bottom base 41 by riveting.

Figure 35:
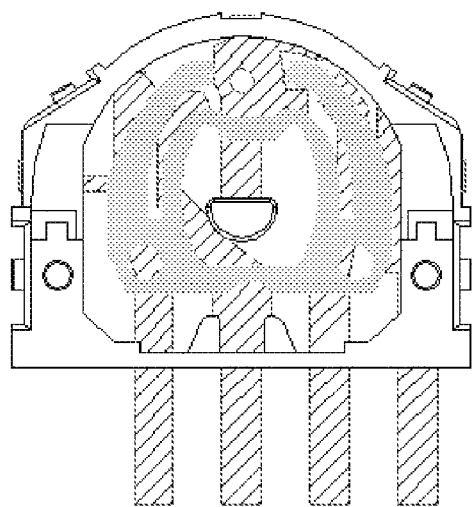
FIG. 35 illustrate the operation principle of the swing composite switch of the sixth embodiment of the present invention.

In use, as seen in FIG. 35, when the center wheel 2 is shaken left and right or the swing component 3 is pressed downwards, the switching piece 45 will contact the metal pieces at different locations on the surface of the bottom base respectively while the metal pieces are connected to different output terminals; therefore, a signal is output, the page is turned left and right and an identification function is performed.

Figure 36:
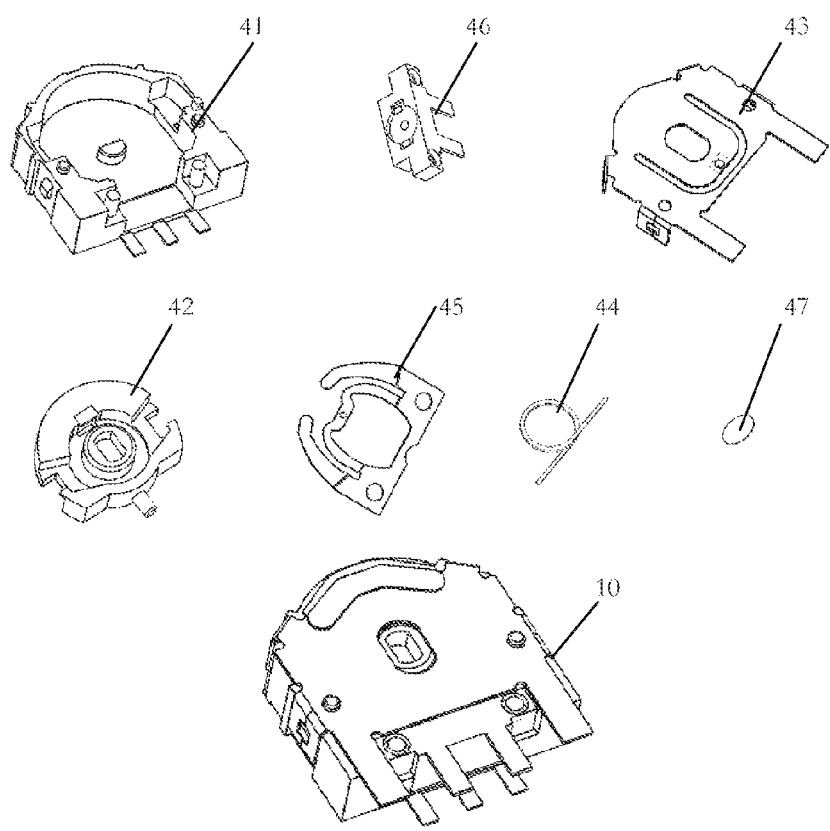
FIG. 36 is an exploded structural view of the swing composite switch of the seventh embodiment of the present invention.

Referring to FIG. 36 illustrating the seventh embodiment of the present invention, the differences of this embodiment from the sixth embodiment are in that: the swing composite switch 10 includes a bottom base 41, a rotator 42, a casing 43, a spring 44, a switching piece 45 and a touch bottom base 46. The switching piece 45 is installed on a reference column of the lower part of the rotator 42, with its both electric conductive convexes on the switching piece 45 contacting the inner surface of the bottom base 41. The spring 44 is installed in the groove of the rotator 42, with its extending part clipped in the gap of the bottom base 41. The touch bottom base 46 is installed in the inner of the bottom base 41, with a touch spring piece 47 installed inside. The touch spring piece 47 is just in the downward press direction of the touch column on the tailing end of the rotator. The casing 43 is installed and fixed on four reference columns of the bottom base 41 by riveting.

In use, in the same way, the center wheel 2 is shaken left and right so that the switching piece 45 contacts the metal pieces on the surface of the bottom base, a signal will be output and the page is turned left and right. However, when the swing component 3 is pressed downwards, the activating column on the tailing end of the rotator will touch and activate the touch spring piece 47, and a signal will be output through the touch bottom base 46, so an identification function is performed.

Figure 37:
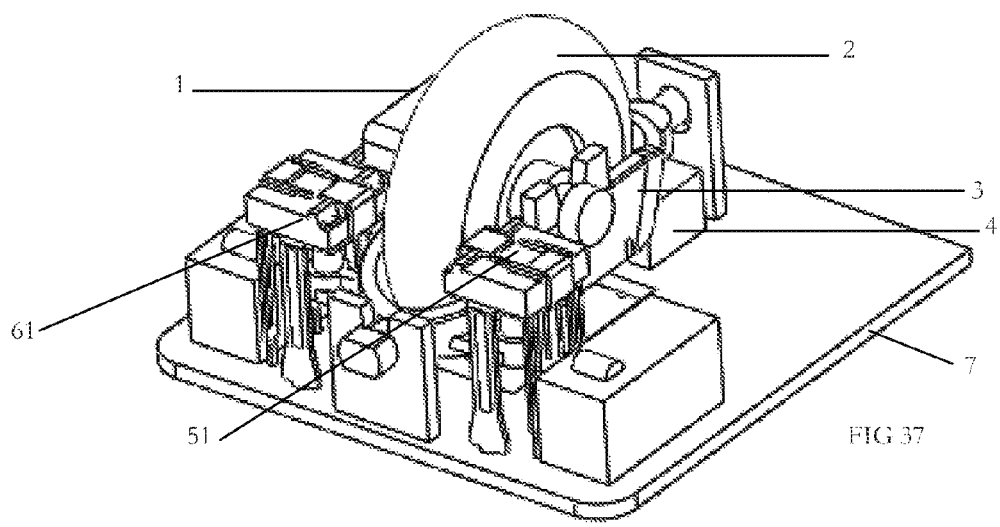
FIG. 37 is a structural view of the eighth embodiment of the present invention.
Figure 38:
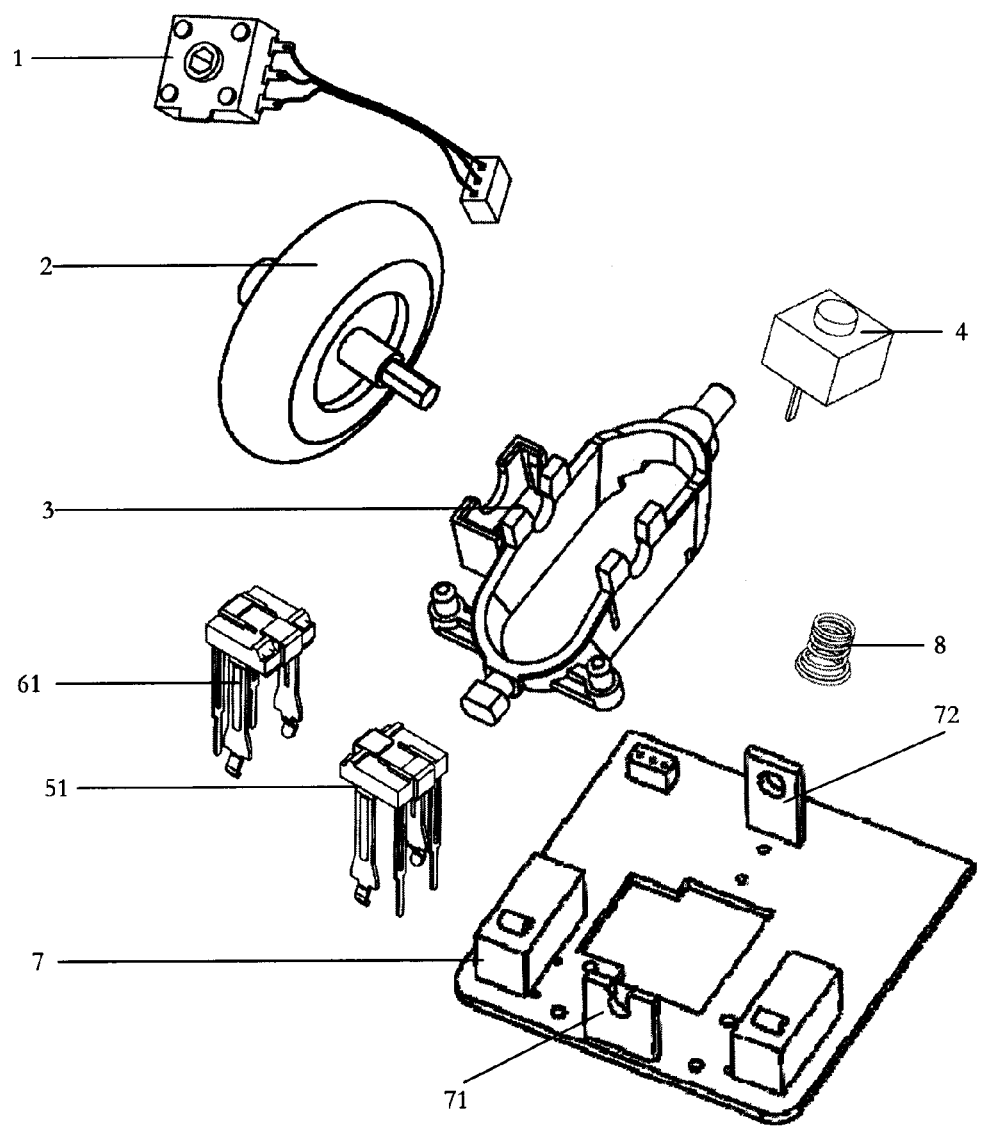
FIG. 38 is an exploded structural view of the eighth embodiment of the present invention.

As seen in FIGS. 37-38 illustrating the eighth embodiment of the present invention, a four axles center wheel module for mouse includes a coder assembly 1 for outputting an encoded pulse electronic signal, a center wheel 2 and a mouse circuit board 7. The coder assembly 1 is set on the center shaft of the center wheel 2. A swing component 3 is set in a slot extending out of the mouse circuit board 7. The supporting shafts 35 and 36 on both ends of the swing component 3 are installed on the supports 71 and 72 on the mouse motherboard or the circuit board. The card grooves 32 and 33 are set on both sides of the swing component 3 to support the center wheel 2. The coder 1 is set in a square slot 31 at one side of the swing component. A wheel downward press key touch arm 38 is set at the trailing end of the swing component 3 while a wheel downward press key switch 4 is set on the mouse circuit board 7 below the wheel downward press key touch arm. The touch arms 36 and 37 are set at both sides of the front part of the swing component 3, with their contact points upward. The headstand switches 51 and 61 are set respectively at locations of the touch arms and are connected to the mouse circuit board through the output terminal and the fixed leg.

Figure 39:
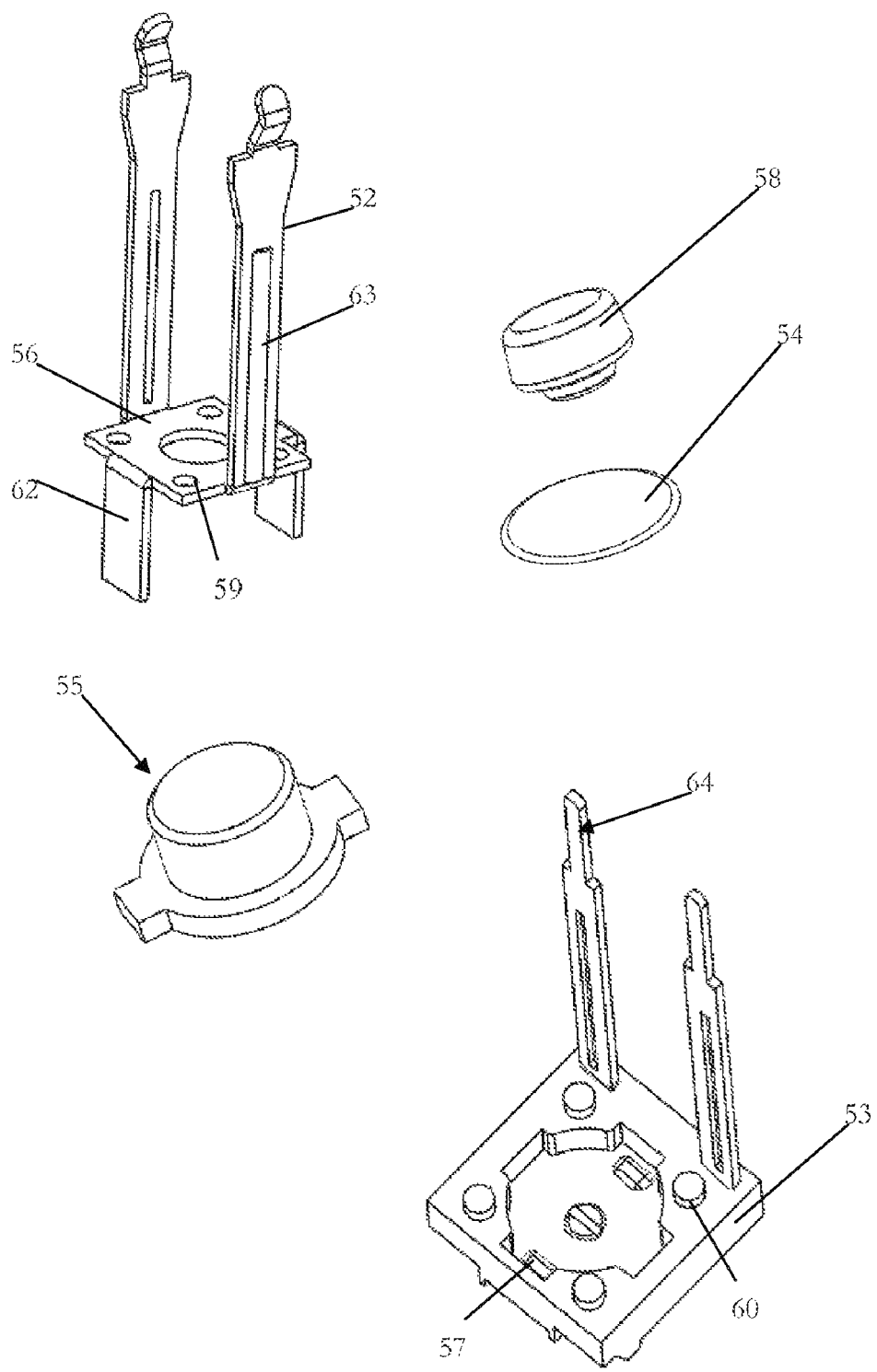
FIG. 39 is an exploded structural view of a headstand switch of the eighth embodiment of the present invention.

As seen in FIG. 39, the headstand switch includes a bottom base 53, a bowl-shaped spring piece 54, a button 55 and a casing 56. The bowl-shaped spring piece 54 is installed in the bottom base 53 while the output terminal 64 extends out of the top of the bottom base 53. The edge of the bowl-shaped spring piece 54 contacts the metal convexes 57 on both sides of the inner cavity of the bottom base 53. The middle part of the bowl-shaped spring piece 54 protrudes and hangs in the air. The button 55 is installed above the bowl-shaped spring piece 54. A soft body 58 is set in the inner cavity of the button 55. The four small holes 59 of the casing 56 are just suited around and riveted with the four riveting columns 60 of the bottom 53. The fixing leg is set on the upper part of the casing. A reinforcing rib 63 for increasing resistance to bending is set on the output terminal 64 and the fixing leg 52. The fixing leg 52 is set on two adjacent edges of the output terminal 64.

When the center wheel 2 is driven to swing right, the left touch arm 37 of the swing component 3 moves upwards and contacts the button of the headstand switch 61 on the mouse circuit board. The headstand switch 61 will output an on/off signal, and the pages in the window can be moved right or turned by a method of connecting the electric circuit inversely in the circuit board. When the center wheel 2 is driven to swing left, the right touch arm 36 of the swing component 3 will move upwards and contact the button of the headstand switch 51 on the mouse circuit board. The headstand switch 51 will output an on/off signal, and the pages in the window can be moved left or turned by a method of connecting the electric circuit inversely in the circuit board. When the center wheel 2 is pressed down, the wheel downward press key touch arm 38 of the swing component 3 will press down and move the wheel downward press key switch 4 on the mouse circuit board, realizing the function of middle button of the mouse. When it is released, the four axles center wheel module for mouse will be reposited by the spring 9.

Figure 40:
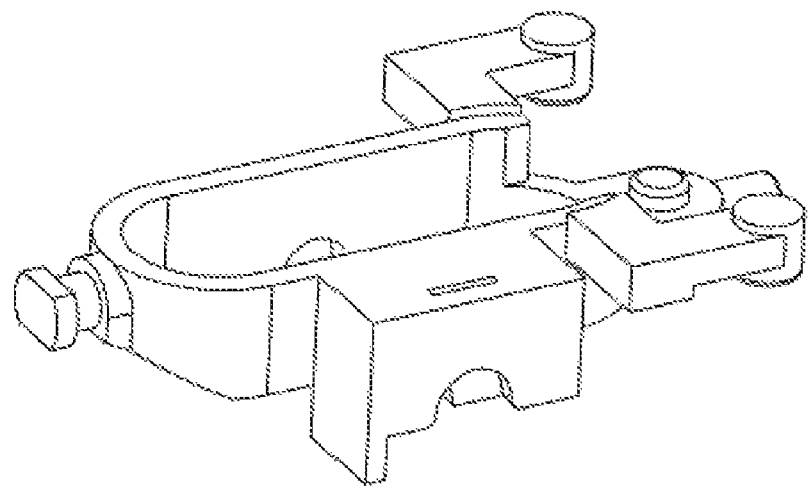
FIGS. 40 and 41 are structural views illustrating a change of the swing component of the eighth embodiment of the present invention.
Figure 41:
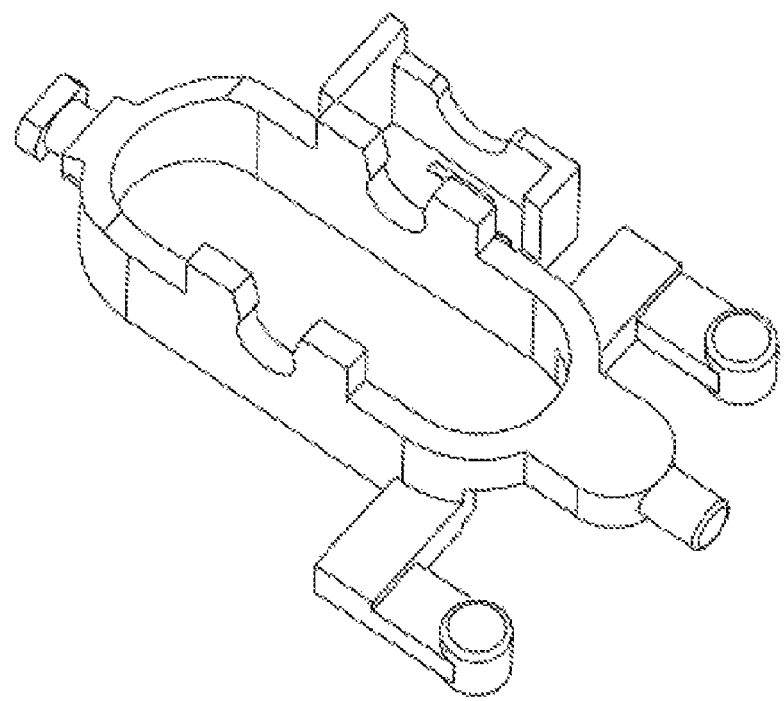

As seen in FIGS. 40-41, the downward contacts can be set on the touch arms at both sides of the swing component. When the touch arm at one side is raised and it contacts the headstand switch through the upward contact, the downward contact on the touch arm at another side will clap the mouse circuit board.

Figure 42:
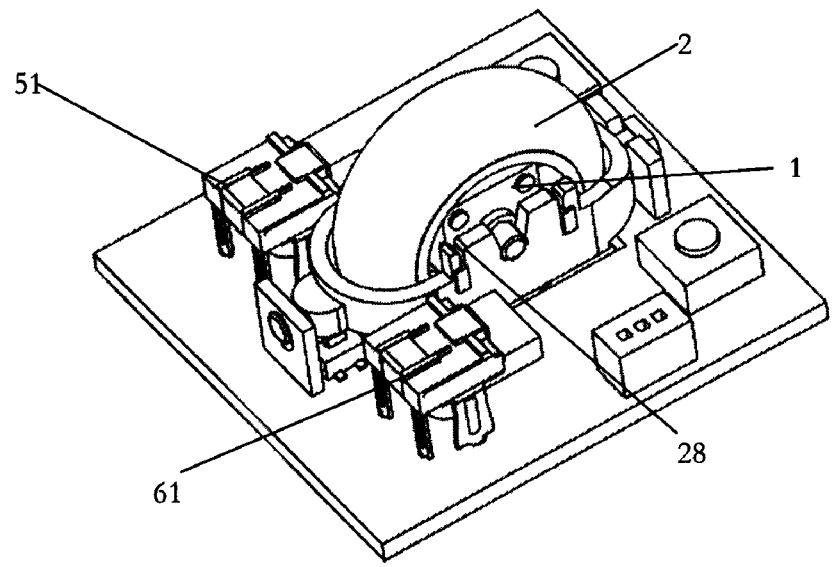
FIG. 42 is a structural view of the ninth embodiment of the present invention.
Figure 43:
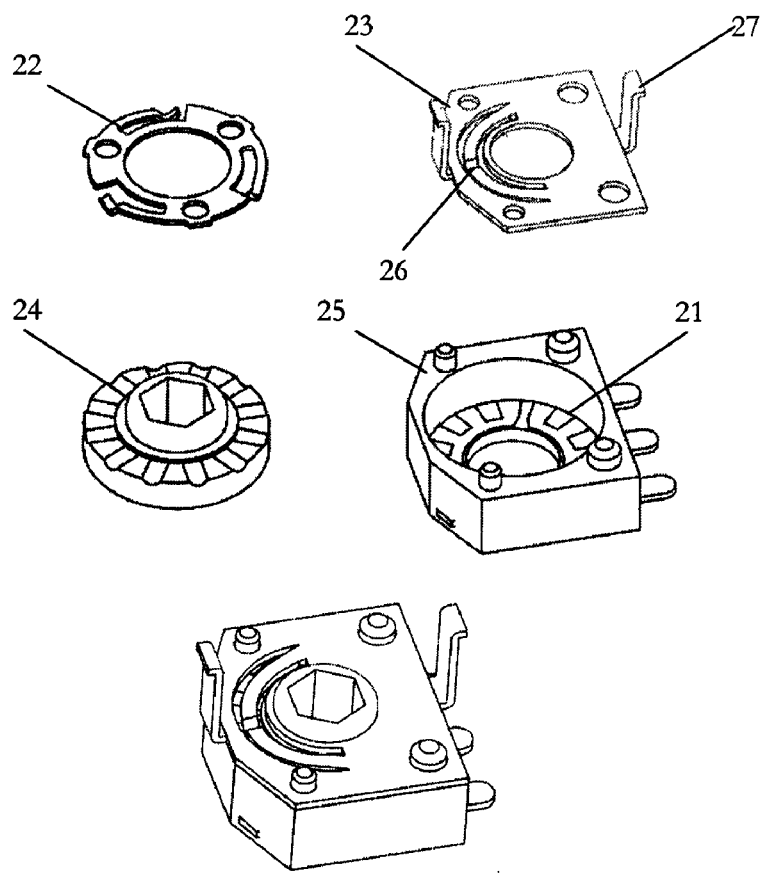
FIG. 43 is an exploded structural view of the coder assembly of the ninth embodiment of the present invention.

As seen in FIGS. 42-43, a four axles center wheel module for mouse includes a coder assembly 1 for outputting a encoded pulse electronic signal, a center wheel 2 and a mouse circuit board 7. The coder assembly 1 is set on the center shaft of the center wheel 2. A swing component 3 is set in a slot extending out of the mouse circuit board 7. The supporting shafts are set at both ends of the swing component 3 and are installed on the support of the mouse motherboard or the circuit board. The card grooves are set at both sides of the swing component 3 to support the center wheel 2. The coder assembly 1 is passed through by the center shaft of the mouse center wheel and is installed in the center wheel. The coder includes a base 25, a casing 23, a rotator 24 and a switching piece 22. The rotator 24 riveted with the switching piece 22 is installed in the groove of the base 25. The switching piece 22 contacts the metal piece 21 in the base 25. The casing 23 is connected to the base 25 so that the switching piece 22 and the rotator 24 are sealed in the base 25. A fixing leg 27 for fixing the coder 1 and a concave contact 26 for positioning the rotator 24 are set on the casing 23. The fixing leg 27 is inserted in the card groove 28 of the swing support to position the coder, preventing the coder 1 from rotating with the rotating shaft of the mouse center wheel 2. A wheel downward press key touch arm 38 is set at the trailing end of the swing component 3 while a wheel downward press key switch 4 is set on the mouse circuit board 7 below the wheel downward press key touch arm. The touch arms 36 and 37 are set at both sides of the front part of the swing component 3, with their contact points upward. The headstand switches 51 and 61 are set respectively at locations of the touch arms and are connected to the mouse circuit board through the output terminal and the fixed leg.

What is claimed is:

1. A four axles center wheel module for a mouse comprising a coder assembly for outputting a encoded pulse electronic signal, a center wheel, a mouse circuit board, wherein the coder assembly is suited around a center shaft of the center wheel, a swing component is installed in a slot on a mouse motherboard or the mouse circuit board, a front end supporting shaft of the swing component is installed on a front support of the mouse motherboard or the circuit board, a card groove is set at both sides of the swing component to support the center wheel, touch arms for cooperating with switches on the mouse circuit board are set at two sides of the swing component, a wheel downward press key touch arm is set at a trailing end of the swing component, a wheel downward press key switch is set on the mouse circuit board below the wheel press downwards key touch arm;

a position limiting device is set respectively on the swing component and the mouse circuit board so that kinetic left or right misoperation signals generated by left or right swinging of the swing component under press operation are prevented.

2. The four axles center wheel module for mouse according to claim 1, wherein a back support is set on the mouse motherboard or the mouse circuit board and a back supporting shaft clipped on the back support is set on a back part of the swing component.

3. The four axles center wheel module for mouse according to claim 2, wherein any one of a front supporting shaft or a back supporting shaft of the position limiting device is configured to have a sector-shaped section, the corresponding support is configured to have a sector-shaped groove, the bottom of the supporting shaft with sector-shaped section can be an arc surface, a plane or an inclination while the bottom of the sector-shaped groove of the support can be a corresponding arc surface, a plane or an inclination.

4. The four axles center wheel module for mouse according to claim 2, wherein the position limiting device comprises: position limiting columns set at both sides of the swing component, and position limited holes set at corresponding positions on the mouse motherboard or the mouse circuit board.

5. The four axles center wheel module for mouse according to claim 2, wherein a lever assembly is set on a cylinder fixed on a back support to contact the touch arms at both side of the swing component; meantime, the switches are set on the mouse circuit board below the lever assembly respectively.

6. The four axles center wheel module for mouse according to claim 5, wherein extending arms being perpendicular to the lever extend from both sides of the lever assembly to the top of the touch arms set at both sides of the swing component; the switches are mounted on places of the mouse circuit board below the joints of the extending arms and the levers respectively.

7. The four axles center wheel module for mouse according to claim 2, wherein the contact points of the touch arms face upwards; headstand switches are set above the two touch arms respectively; when the swing component swings left and right, the touch arms will contact the corresponding headstand switch; the head stand switches are connected to the mouse circuit board through output terminals and fixed legs.

8. The four axles center wheel module for mouse according to claim 7, wherein said headstand switch comprises a bottom base, a bowl-shaped spring piece, a button and a cover piece, the bowl-shaped spring piece is installed in the bottom base while output terminal extends out of the top of the bottom base; the edge of the bowl-shaped spring piece contacts metal convexes on both sides of the inner cavity of the bottom base and the middle part of the bowl-shaped spring piece is protruded and hung in the air; above the bowl-shaped spring piece is installed the button, in the inner cavity of the button is set a soft body contacting the spring piece directly; four small holes of the cover piece are just suited around four riveting columns and are riveted with them; the top of the cover piece are set on fixed legs while the lower part is fixed on the bottom base by a clip leg.

9. The four axles center wheel module for mouse according to claim 7, wherein downward contacts can be set on the touch arms at both sides of the swing component; when the touch arm at one side is raised and it contacts the headstand switch through the upward contact, the downward contact on the touch arm at the other side will clap the mouse circuit board.

10. The four axles center wheel module for mouse according to claim 1, wherein the coder assembly is set in a square slot on one side of the swing support.

11. The four axles center wheel module for mouse according to claim 1, wherein the coder assembly is installed in the inner space of the center wheel.

12. The four axles center wheel module for mouse according to claim 11, wherein the coder comprising a base, a casing, a rotator and a switching piece, the rotator riveted with the switching piece is installed in a groove of the base while the switching piece contacts a metal piece in the base; the casing is connected to the base so that the switching piece and the rotator is sealed in the base; on the casing is set a fixing leg for fixing the coder, which is inserted in the card groove of the swing support to position the coder, so as to prevent the coder from rotating with a rotating shaft of the mouse center wheel.

13. A four axles center wheel module for mouse comprising a coder assembly for outputting a encoded pulse electronic signal, a center wheel and a mouse circuit board, with the coder assembly suited around a center shaft of the center wheel, wherein a swing support is set in a slot on a mouse motherboard or the mouse circuit board; on one end of the swing support is set a supporting shaft which is installed on the support of the mouse motherboard or the mouse circuit board; a card groove is set at both sides of the swing support to support the center wheel; on one end of the swing support is set a rotating shaft, which is mounted in the center hole of the swing composite switch fixed on the circuit board; a position limiting device is set respectively on the swing component and the mouse circuit board so that kinetic left or right misoperation signals generated by left or right swinging of the swing component under press operation are prevented.

14. The four axles center wheel module for mouse according to claim 13, wherein the swing composite switch comprises a bottom base, a rotator, a casing, a spring and a switching piece, the switching piece is installed on a reference column, with its three electric conductive convexes on the switching piece contacting the inner surface of the bottom base; the spring is installed in a groove of the rotator, with an extending part thereof clipped in a gap of the bottom base; the casing is installed and fixed on four reference columns of the bottom base by riveting.

15. The four axles center wheel module for mouse according to claim 13, wherein the swing composite switch comprises a bottom base, a rotator, a casing, a spring, a switching piece and a touch bottom base, the switching piece is installed on a reference column, with its three electric conductive convexes on the switching piece contacting the inner surface of the bottom base; the spring is installed in a groove of the rotator, with an extending part thereof clipped in the gap of the bottom base; the touch bottom base is installed in the inner of the bottom base; in the inner of the touch bottom base is installed a touch spring piece, which is just in the downward pressing direction of a touch column on the tailing end of the rotator; the casing is installed and fixed on four reference columns of the bottom base by riveting.

16. The four axles center wheel module for mouse according to claim 13, wherein a downward press key touch arm is set on one end of the supporting shaft of the swing support while a downward press key switch is set at the corresponding position on the mouse circuit board.

17. The four axles center wheel module for mouse according to claim 16, wherein the said swing composite switch comprising a bottom base, a rotator, a casing, a spring and a switching piece, on a reference column is installed the switching piece, both electric conductive convexes of the switching piece contact the inner surface of the bottom base; the spring is installed in a groove of the rotator, with an extending part thereof clipped in a gap of the bottom base; the casing is installed and fixed on four reference columns of the bottom base by riveting.

\* \* \* \* \*